(12) United States Patent
Tarditi

(10) Patent No.: US 7,509,338 B1
(45) Date of Patent: Mar. 24, 2009

(54) COMPACT GARBAGE COLLECTION TABLES

(75) Inventor: David R. Tarditi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/215,896

(22) Filed: Aug. 30, 2005

Related U.S. Application Data

(63) Continuation of application No. 09/919,186, filed on Jul. 30, 2005, now Pat. No. 7,085,789, and a continuation of application No. 11/176,145, filed on Jul. 6, 2005.

(51) Int. Cl.
*G06F 17/00* (2006.01)

(52) U.S. Cl. .................. 707/102; 707/1; 707/100; 707/200; 707/206

(58) Field of Classification Search .............. 707/1, 707/100, 102, 200, 206; 711/E12.009, E12.013, 711/E12.014; 714/141
See application file for complete search history.

(56) References Cited

U.S. PATENT DOCUMENTS

| 4,890,223 | A | | 12/1989 | Cruess et al. ............... 711/207 |
|---|---|---|---|---|
| 5,848,423 | A | * | 12/1998 | Ebrahim et al. ............. 707/206 |
| 6,185,581 | B1 | * | 2/2001 | Garthwaite ................. 707/206 |
| 6,185,584 | B1 | | 2/2001 | Garthwaite ................. 707/206 |
| 6,308,319 | B1 | * | 10/2001 | Bush et al. .................. 717/141 |
| 2002/0199176 | A1 | * | 12/2002 | Sokolov et al. ............. 717/148 |

OTHER PUBLICATIONS

Tarditi David, Compact Garbage Collection Tables, 2000, ACM, pp. 50-58.*

Stichnoth et al., Support for Garbage Collection at Every Instruction in a Jave Compiler, 1999 ACM, pp. 118-127.*

Diwan et al., Compiler Support for Garbage Collection in a Statically Typed Language, 1992 ACM, pp. 273-282.*

Printezis et al., A Generational Mostly-concurrent Garbage Collector, 2000 ACM, pp. 143-154.*

Andrew W. Appel, Simple Generational Garbage Collection and Fast Allocation, 1998, Prince University, pp. 1-16.*

"Compiler Support for Garbage Collection in a Statically Typed Language" by Amer Diwan, Eliot Moss, Richard Hudson; 1992 ACM 0-89791-476-7/92/0006/0273, pp. 273-282.

"Marmot: an optimizing compiler for Java" by Robert Fitzgerald, Todd B. Knoblock, Erik Ruf, Bjame Steensgaars and David Tarditi; Softward—Practice and Experience. 2000; 30: p. 199-232.

Fitzgerald, R.; Knoblock, T.; Ruf, E.; Steensgaard, B.; Traditi, D.; *Marmot: An Optimizing Compiler for Java*; Jun. 16, 1999; pp. 1-29.

Notice of Allowance, co-pending U.S. Appl. No. 10/176,145, mailed Sep. 19, 2008.

* cited by examiner

*Primary Examiner*—Pierre M Vital
*Assistant Examiner*—Fred I Ehichioya
(74) *Attorney, Agent, or Firm*—Merchant & Gould, P.C.

(57) ABSTRACT

A compact set of garbage collection tables takes advantage of the redundancies often inherent in live pointer information: multiple call sites in a call stack often share common live pointer information. A call site table lists call site identifiers associated with call stack locations having pointers to heap-allocated data. An associated indirection table (i.e., a descriptor reference table) provides a reference (e.g., an index or a pointer) into a descriptor table, which stores unique descriptors of the call stack locations of interest. The aggregate memory space used by the three tables (i.e., the call site table, the indirection table, and the descriptor table) is typically less than the memory space used by the monolithic live pointer information table.

11 Claims, 8 Drawing Sheets

COMPACT GARBAGE COLLECTION TABLES

RELATED APPLICATIONS

This application is a continuation application of U.S. patent application Ser. No. 09/919,186, filed Jul. 30, 2001 and co-pending U.S. patent application Ser. No. 11/176,145 filed Jul. 6, 2005 entitled COMPACT GARBAGE COLLECTION TABLES, which is hereby incorporated herein by reference.

TECHNICAL FIELD

The invention relates generally to memory management in a computer system, and more particularly to garbage collection of memory in a computer system.

BACKGROUND OF THE INVENTION

A computer program can use multiple categories of data storage during execution. Two such data storage categories include a call stack and a heap. The call stack is typically an area of memory used to store runtime data for methods, such as local variables, method return addresses, intermediate results, etc. The lifetime of data in a call stack is limited by the lifetime of the method with which the data is associated. Alternatively, a heap includes an area of memory reserved for data that is created at runtime, wherein the lifetime of data in a heap typically is not determined by the lifetime of a particular method. In some approaches, however, a heap may also contain data normally put on the stack.

During execution, a program may no longer need data that has been allocated in the heap. Therefore, a method is required to reclaim the unneeded memory space from the heap. One method involves explicit program instructions to "free" the unneeded heap memory.

Another method is called "garbage collection." Garbage collection generally involves reclaiming the heap memory that is no longer being used by the program. During garbage collection, live pointer information is typically identified using one or more garbage collection tables. "Live pointer information" refers to descriptors of memory locations in the call stack and registers that contain pointers to heap-allocated data. The garbage collector uses such tables to traverse the call stack and find memory locations that contain live pointers. The garbage collector can then follow the live pointers into the heap and scan for additional live pointers. However, in existing approaches, garbage collection tables are often large relative to the executable code size, thereby requiring substantial system resources.

Multiple call sites often share common live pointer information, which is stored in data structures called "descriptors". That is, multiple call sites tend to have pointers into the heap at the same stack locations and in the same registers. Existing garbage collection techniques merely duplicate the shared live pointer information for each call site in a monolithic live pointer information table. This duplication contributes to the large size of prior art garbage collection tables. In at least one alternative existing approach, live pointer information of "adjacent" call sites is combined into a single descriptor, thereby reducing the size of the garbage collection table. ("Adjacent" is used in the context to refer to the relative position of call sites in memory.) However, undesirable duplications of live pointer information (e.g., for non-adjacent call sites that share common descriptors) still exist with these methods.

SUMMARY OF THE INVENTION

Embodiments of the present invention solve the discussed problems using a set of garbage collection tables involving at least one level of indirection. The compact garbage collection tables take advantage of the redundancies that can be inherent in live pointer information: multiple call sites often share common live pointer information. Therefore, the compact garbage collection tables remove the duplication of shared descriptors and map the call sites to appropriate descriptors indirectly, through a descriptor reference table. A call site table lists call site identifiers associated with call stack locations and registers that contain pointers to heap-allocated data. An associated indirection table (i.e., a descriptor reference table) provides a reference (e.g., an index or a pointer) into a descriptor table, which stores unique descriptors of the call stack locations and registers of interest. The aggregate memory space used by the three tables (i.e., the call site table, the indirection table, and the descriptor table) is typically less than the memory space used by a monolithic garbage collection table.

In one implementation of the present invention, a computer-readable medium having stored thereon compact garbage collection tables is provided. The compact garbage collection tables identify elements of a root set used in reclaiming memory from a heap during runtime. A call site table stores call site identifiers. A descriptor table stores a set of unique descriptors, where each unique descriptor may describe one or more pointers into the heap. A descriptor reference table is associated with the call site table. Each entry in the descriptor reference table maps an entry in the call site table to a descriptor in the descriptor table.

In other implementations of the present invention, articles of manufacture are provided as computer program products. One embodiment of a computer program product provides a computer program storage medium readable by a computer system and encoding a computer program for executing a computer process that builds compact garbage collection tables adapted for use in reclaiming memory from a heap during runtime. Another embodiment of a computer program product may be provided in a computer data signal embodied in a carrier wave by a computing system and encoding the computer program that builds compact garbage collection tables adapted for use in reclaiming memory from a heap during runtime.

The computer program product encodes a computer program for executing on a computer system a computer process for building compact garbage collection tables adapted for use in reclaiming memory from a heap during runtime is provided. A call site table storing call site identifiers is generated. A descriptor table storing a set of unique descriptors is generated, where each unique descriptor may describe one or more pointers into the heap. A descriptor reference table associated with the call site table is generated. Each entry in the descriptor reference table maps a call site identifier in the call site table to one of the unique descriptors in the descriptor table.

In another implementation of the present invention, a method of identifying elements of a root set for garbage collection using compact garbage collection tables is provided. A call site identifier in a call site table is located. A descriptor reference in a descriptor reference table is identified as being associated with the call site identifier. A descriptor referenced by the descriptor reference is identified. The descriptor reference maps between the call site identifier and the descriptor, wherein the descriptor is one of a set of unique descriptors in a descriptor table. The descriptor is accessed to determine the elements of the root set for garbage collection.

In yet another embodiment of the present invention, a runtime system that identifies elements of a root set for a garbage collection using compact garbage collection tables is provided. A garbage collector accesses a call site table storing call site identifiers, a descriptor table storing a set of unique descriptors (where each unique descriptor may describe one or more pointers into the heap), and a descriptor reference table associated with the call site table to identify elements of a root set. Each pointer is an element in the root set. Each entry in the descriptor reference table maps an entry in the call site table to a descriptor in the descriptor table. At least one descriptor is mapped to a plurality of call sites.

These and various other features as well as other advantages, which characterize the present invention, will be apparent from a reading of the following detailed description and a review of the associated drawings.

DETAILED DESCRIPTION OF THE INVENTION

A runtime system provides automatic storage management by periodically reclaiming unused heap memory through a process referred to as "garbage collection". Garbage collection identifies heap memory that is in use and frees the remaining heap memory that is not in use. To identify memory that is in use, a garbage collector in a runtime system first locates all pointers that are either located in registers or stored in the call stack. These pointers are considered elements of a root set, from which garbage collection of the heap begins. All objects that the pointers reference are marked as "in use". Thereafter, each "in use" object is scanned for pointers. This process repeats recursively until all relevant memory is scanned. In other words, the objects referenced by the pointers of each "in use" object are located and are also marked as "in use", after which each new "in use" object is scanned for live pointers, and so on until all relevant memory that is "in use" has been identified. Memory that is not marked "in use" may be reclaimed by the runtime system for reallocation during execution.

In an embodiment of the present invention, a compiler generates tables that a garbage collector can use to identify pointers stored in registers and on the call stack. For example, such tables can indirectly map a return address associated with a call site to a descriptor that describes live pointer locations at the time the call was made. Specifically, the descriptor describes which registers contain pointers and which stack locations in the call stack for the procedure contain pointers. In contrast to the prior art, the mapping between the call site and the descriptor is indirect, allowing multiple call sites to be mapped to the same descriptor.

A runtime system can include a garbage collector in an embodiment of the present invention. During runtime (e.g., at a certain garbage collection point designated during execution), the garbage collector accesses the compact garbage collection tables to identify an initial set of memory locations containing pointers. The initial set acts as part of the root set of memory locations used in a garbage collection scan.

Figure 1:
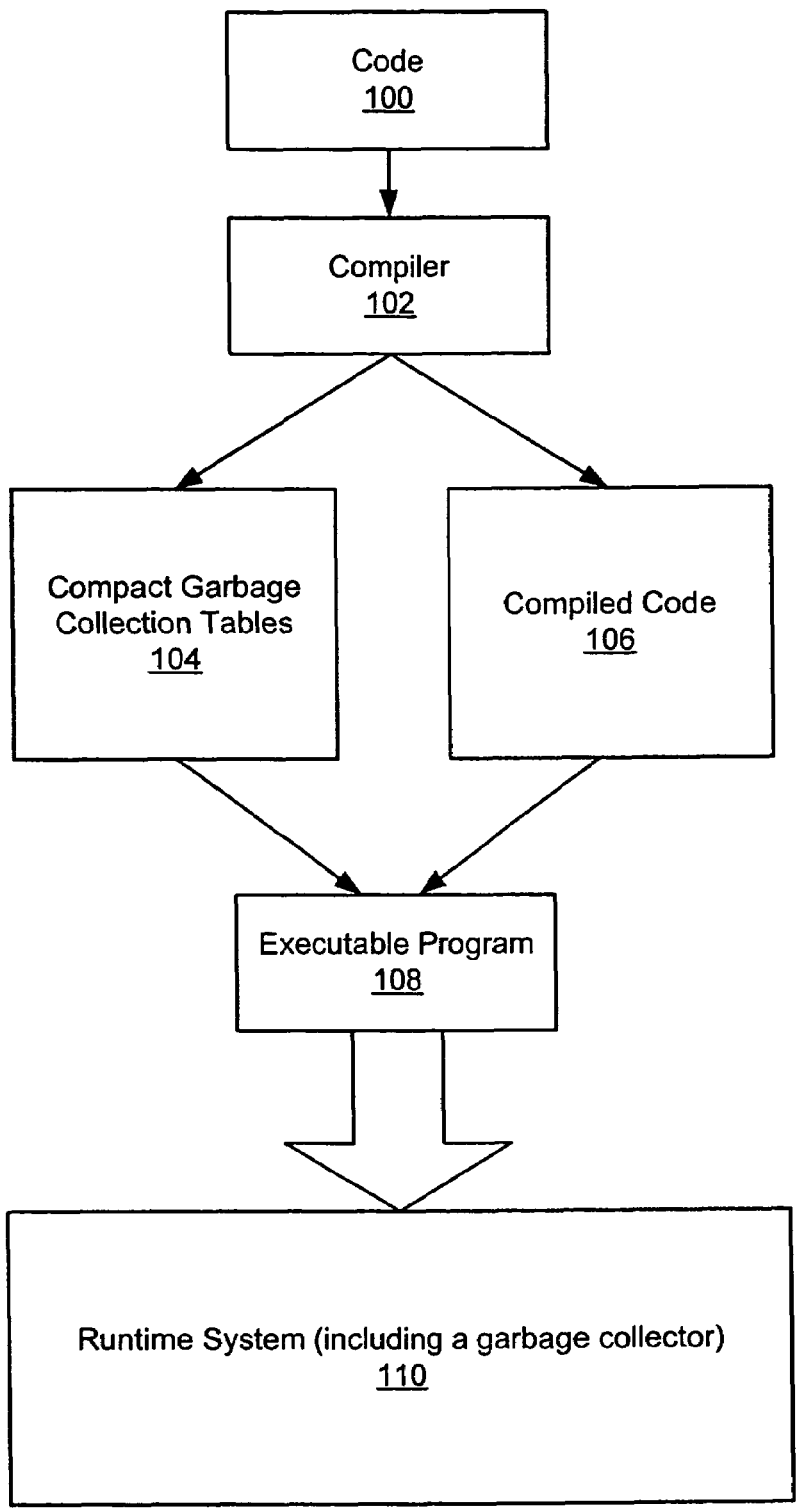
FIG. 1 illustrates a compiler and a runtime system in an embodiment of the present invention.

FIG. 1 illustrates a compiler and a runtime system in an embodiment of the present invention. Code 100 represents program code input into a compiler 102. The code 100 may be embodied by any type of program code, including program source code (e.g., assembly code or a high-level programming language code, such as C#) or intermediate language program code (e.g., Microsoft IL code). The compiler 102 evaluates the code 100 and generates compiled code 106 (e.g., machine code or intermediate code) and compact garbage collection tables 104. The compact garbage collection tables and the compiled code 106 are combined into an executable program 108, which is executed in a runtime system 110. The compact garbage collection tables 104 assist a garbage collector in the runtime system 110 in locating and updating all pointers in the stack and in the registers (e.g., processor registers).

In generating the compact garbage collections tables 104, the compiler 102 maps a return address for a procedure call to a descriptor data structure that describes pointer locations (e.g., registers and stack locations) at the time the procedure call is made. A descriptor describes which registers contain pointers and which stack locations in the stack frame of the calling procedure contain pointers.

During runtime, the compact garbage collection tables 104 serve as a starting point for scans in a garbage collection operation. The garbage collector accesses the compact garbage collection tables to identify an initial set of memory locations containing pointers. The initial set acts as part of the root set of memory locations used in a garbage collection scan. Based on the root set, the garbage collector scans heap memory referenced by the identified root set to determine which objects are "in use" and which objects are not "in use". Those heap memory associated with objects that are not "in use" may be reclaimed by the runtime system.

Figure 2:
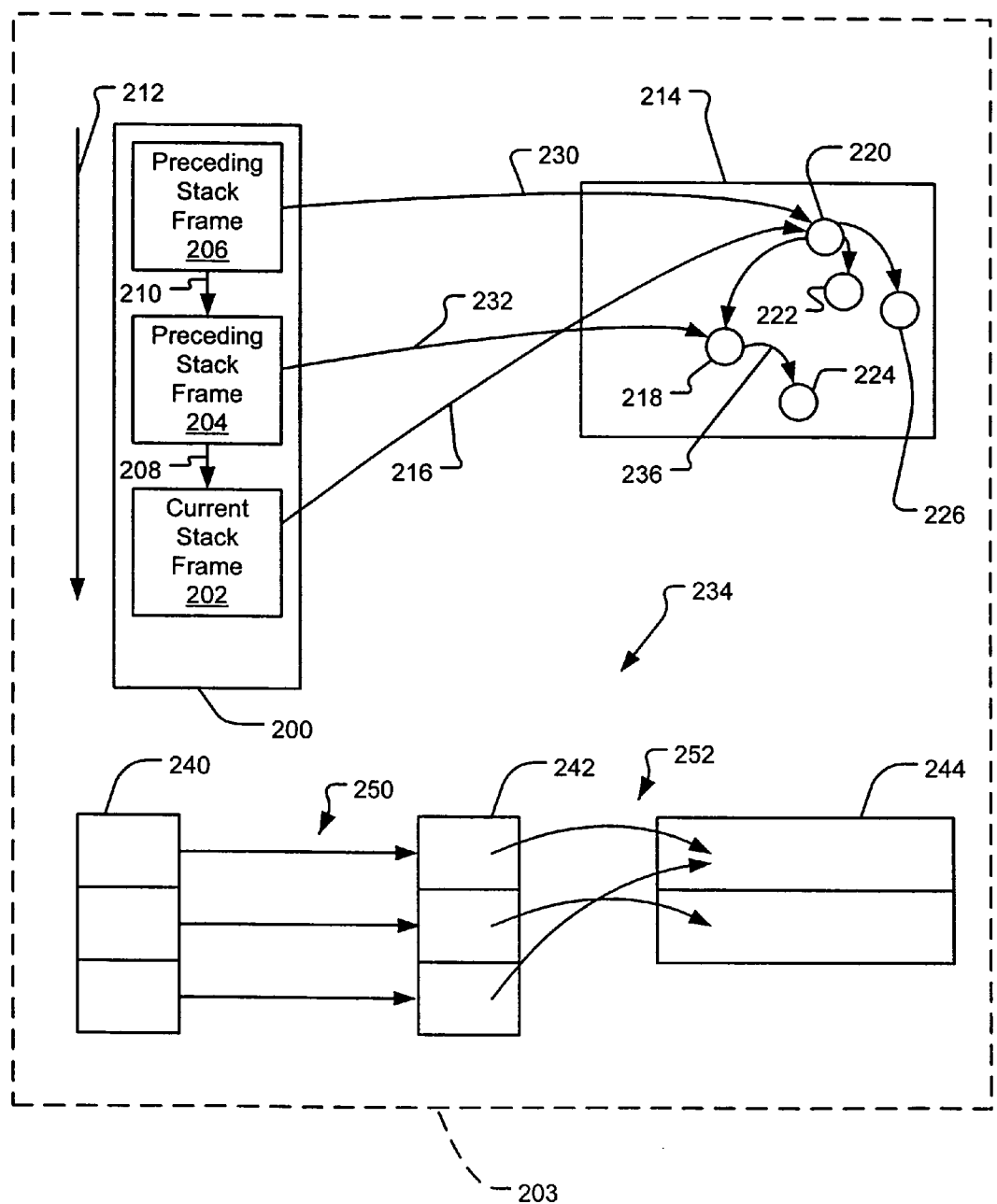
FIG. 2 illustrates a set of compact garbage collection tables associated with a series of stack frames and a heap in an embodiment of the present invention.

FIG. 2 illustrates a set of compact garbage collection tables associated with a series of stack frames and a heap in an embodiment of the present invention. A call stack 200 includes three stack frames: a preceding stack frame 206, another preceding stack frame 204, and a current stack frame 202 (where the call stack is growing in direction of arrow 212). Procedure calls between each stack frame are represented by arrows 210 and 208. Arrows 230, 232, and 216 represent pointers from the call stack that reference objects in a heap 214. The exemplary combination of compact garbage collection tables 234, call stack 200, and heap 214 are represented as being stored in memory 203. The pointers 216 and 230 reference an object 220 in the heap, which in turn references objects 222 and 226. The pointer 232 references object 218 in the heap, which in turn references object 224.

Each stack frame is associated with the execution of some procedure. Within each stack frame, there exists an instruction at which execution of that procedure has stopped (for example, because of a call to another procedure). The compact garbage collection tables 234 map each point at which execution has stopped to a "descriptor". In an embodiment of the present invention, the descriptor describes stack locations in the associated stack frame and registers that are in use at that stopping point and that contain heap pointers. (In some circumstances, however, a descriptor may not describe any locations of pointers.) Those stopping points are typically "call sites", although execution may stop within a procedure at a point other than a call site. For example, in a multi-threaded system, it is possible for execution of a particular thread to be stopped at some instruction other than a call site.

The garbage collector in the runtime system accesses the compact garbage tables 234 to start its scans. For example, the garbage collector can learn from the compact garbage collection tables 234 that a stack location in the preceding stack frame 204 contains the pointer 232 that references the object 218 in the heap. The garbage collector can then follow the pointer 232 to the object 218 and scan the object for the pointer 236 to heap object 224, which will result in garbage collector scanning the object 224 for pointers. At the completion of this exemplary scan sequence, the garbage collector will have identified objects 218 and 224 as objects referenced by "live" pointers. As such, the garbage collector does not reclaim the memory occupied by objects 218 and 224 during the exemplary collection operation. It should be understood that the garbage collector may also use the compact garbage collection tables 234 to follow the pointers 216 and 230 during scans in the exemplary garbage collection. The stack frames that contain pointers 216 and 230 are described by the same descriptor in the descriptor table 244.

In an embodiment of the present invention, the garbage collection tables 234 include a call site table 240, a descriptor reference table 242, and a descriptor table 244. Each entry in the call site table 240 stores a call site identifier, such as the address at which execution will resume after the call ("the return address for the call"). Each entry in the descriptor reference table 242 stores a descriptor identifier associated with the call site identifier. In one embodiment, the descriptor identifier is embodied by an index to an entry in the descriptor table 244. In an alternative embodiment, a different type of reference to a descriptor may be employed, such as a pointer to a descriptor, a hash key, or any other type of reference. The descriptor table 244 includes unique descriptors describing which registers contain pointers and which stack locations in the stack frame for the procedure contain pointers. In an alternative embodiment, the call site table 240, the descriptor reference table 242, and the descriptor table 244 may be in different forms, such as hash structures, linked lists, or other data structures.

As shown in FIG. 2, the first and third entries of the descriptor reference table 242 (which correspond to the first and third entries of the call site table 240) references the first entry in the descriptor table 244, because the corresponding call sites share common sets of pointer locations and, therefore, share the same unique descriptor. The second entry of the descriptor reference table 242 (which corresponds to the second entry of the call site table 240) references the second entry of the descriptor table 244. As such, the descriptor in the first entry of the descriptor table 244 is referenced in association with two non-adjacent call sites, avoiding duplication of the shared descriptor. It should be understood that "adjacent" refers to two or more call site entries that are logically in sequence in the call site table 240.

In one embodiment, the compact garbage collection tables 234 comprise a call site table 240 listing a sequence of call site identifiers (e.g., return addresses for calls), a descriptor reference table 242 listing a sequence of descriptor identifiers, and a descriptor table 244 storing a set of descriptors. Each descriptor identifier corresponds to a call site (as shown by arrows 250) and maps the call site to a descriptor (as shown by arrows 252). For those call sites sharing a common descriptor, the descriptor identifiers corresponding to those call sites reference the same descriptor so as to avoid duplication of identical descriptors.

It should be understood, however, that each descriptor, as well as each call site identifier and each descriptor identifier, may be further decomposed to avoid duplication of common components. For example, call site identifiers may be decomposed into a segmented architecture similar to the segmented addressing mode used in older 80×86 processors. Alternatively, a descriptor may be segmented into a register descriptor and a stack descriptor, where either one or both of the descriptors may be shared by multiple call sites. See FIG. 4 for a description of an exemplary descriptor.

Figure 3:
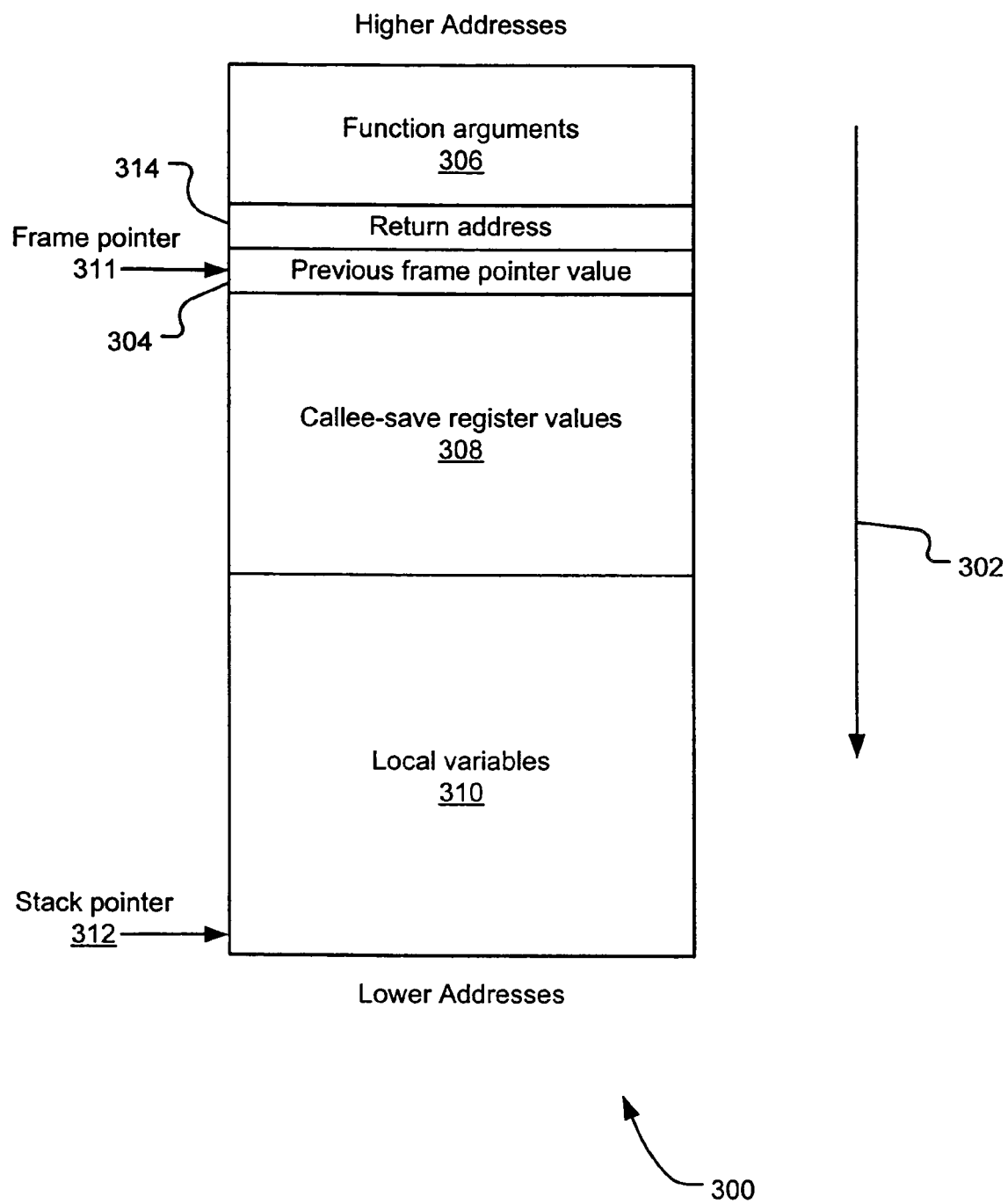
FIG. 3 illustrates an exemplary stack frame in an embodiment of the present invention.

FIG. 3 illustrates an exemplary stack frame of a called procedure in an embodiment of the present invention. The call stack 300 grows in the direction of the arrow 302, although the sequence of fields within a stack frame is not intended to be limited by the exemplary configuration shown in FIG. 3. The previous frame pointer 304 references the saved frame pointer of the calling procedure. Function arguments 306 represent argument values to the called procedure and are located at positive offsets from the frame pointer 304, whereas local variables 310 of the called procedure are stored at negative offsets from the frame pointer 304. Callee-save register values 308, which may be associated with three callee-save registers in an 80×86 processor, for example, are saved in the memory locations immediately below the previous frame pointer value 304 in the stack frame 300. The return address 314 represents the address to which processing returns after execution of the function completes. In one embodiment for an 80×86 processor, the return address 314 corresponds to a value stored in a return address register of the processor when the function of the stack frame 300 was called. The stack pointer 312 represents the address indicating the bottom of the stack frame for the called procedure. The frame pointer 311 is used for access to local variables 310 because the stack pointer may vary as the procedure executes. The frame pointer and the convention for saving it also simplify traversal of the stack by allowing the locations of stack frames and return addresses to be easily identified. It should be understood, however, that is possible to omit the use of frame pointers without departing from the present invention. Techniques for omitting the use of a frame pointer are well-known in the field.

In some embodiments of the present invention, each function call can represent a garbage collection point (e.g., a point of program execution), at which garbage collection may occur, although some function calls need not be designated garbage collection points. For example, it is quite natural that calls to memory-allocating functions be designated garbage collection points because some additional memory may be required to fill the memory-allocating requests. In an embodiment of the present invention, all function calls, except for calls to non-allocating functions, are considered garbage collection points. It should be understood, however, that selection of alternative program points to perform garbage collection does not depart from present invention. At each garbage collection point, the garbage collector reads the compact garbage collection tables to identify the root set of the garbage collection scan. The garbage collector then follows the pointers to scan referenced objects in the heap.

Figure 4:
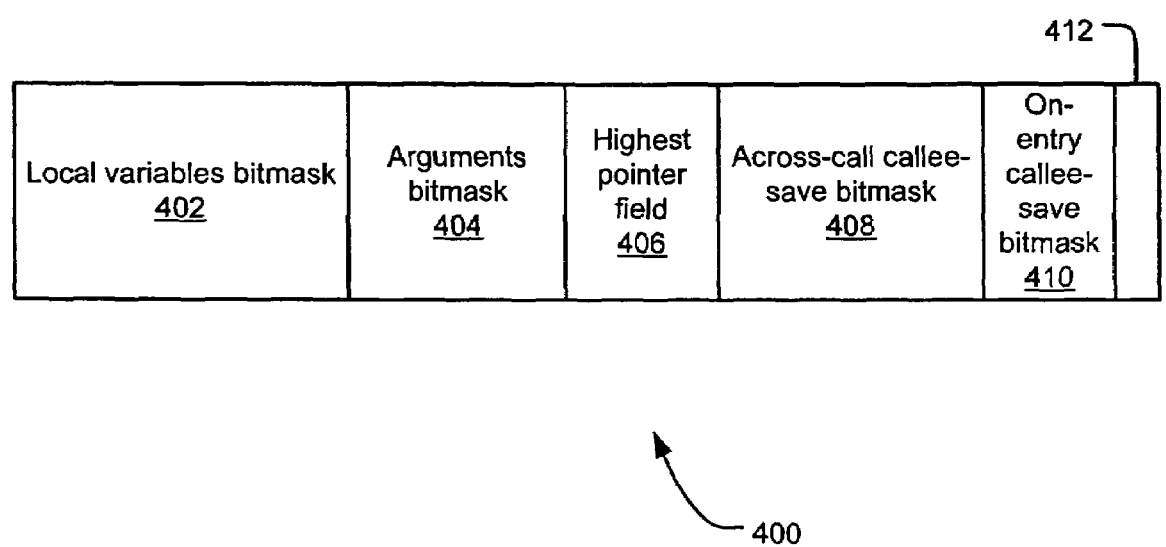
FIG. 4 illustrates the format of an exemplary descriptor in an embodiment of the present invention.

FIG. 4 illustrates the format of an exemplary descriptor in an embodiment of the present invention. In the illustrated embodiment, a descriptor 400 contains six fields. A local variables bitmask 402 indicates which local variables stack locations contain live pointers (i.e., pointers to objects in the heap). For example, a bit location storing a "1" can indicate that a corresponding storage location (e.g., a stack location or a register) contains a live pointer. An arguments bitmask 404 indicates which argument stack locations contain live pointers. The size of the arguments bitmask 404 is variable and is specified by a value stored in a highest pointer field 406, which indicates the highest address (e.g., a 32-bit word) containing a live pointer in the arguments bitmask 406 of the stack frame. As such, the highest pointer field 406 specifies the number of arguments described in the argument bitmask 404 and, hence, specifies the size of the arguments bitmask 404. If the highest pointer field 406 contains a zero value, then no arguments contain live pointers. An across-call callee-save bitmask 408 describes the use of each of the callee-save registers across a call. A callee-save register can be known to contain a pointer, a non-pointer, or to be unchanged from the beginning of the function (that is, whether or not the callee-save register contains a pointer depends on the use of the register in the caller of this function). An on-entry callee-save bitmask 410 describes which callee-save registers were saved in the stack frame at entry to the function.

Figure 5:
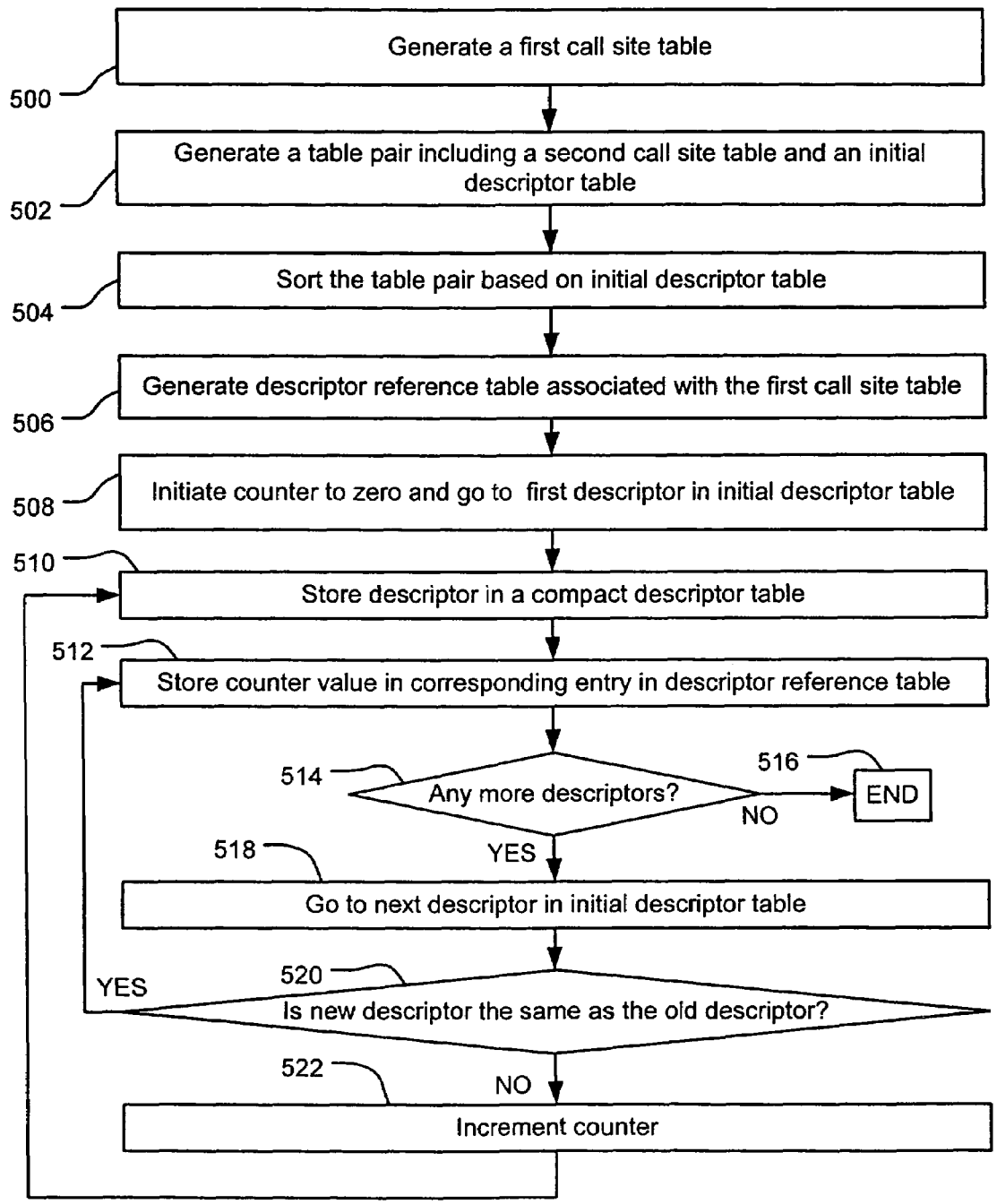
FIG. 5 depicts operations for building compact garbage collection tables in an embodiment of the present invention.

In an embodiment of the present invention, a descriptor type indicator 412 provides an "escape" mechanism that is used to handle stack frames that cannot be described by this descriptor (for example, because the stack frame has too many pointers or the procedure has too many arguments). The descriptor type indicator has two values. One value indicates that this descriptor is a compact descriptor that describes the stack frame location. Another value indicates that this descriptor is an escape descriptor. In that case, the remaining fields are used to find a variable-sized descriptor that is of sufficient size to describe the locations of pointers. The variable-sized descriptor may also use a different format for describing pointer locations. The remaining fields may be treated as a pointer address in memory or as an index into a table of variably-sized descriptors. In the illustrated embodiment, the size of the local variables bitmask 402 is determined by the remaining bits available in the descriptor, based on the size of the other fields FIG. 5 depicts operations for building compact garbage collection tables in an embodiment of the present invention. A generating operation 500 generates a first call site table, which contains a call site identifier for each call site. An exemplary call site identifier is the return address for the call site (the address of the instruction immediately following the call, where execution will resume when the call is completed). A generating operation 502 generates a pair of tables including a second call site table and an initial descriptor table. The second call site table also includes a call site identifier for each call site and may be a copy of the first call site table. The initial descriptor table includes descriptors for each call site, regardless of whether one descriptor is a duplicate of another. The generation of the table pair in operation 502 in an embodiment of the present invention may employ known techniques for generating garbage collection tables, including a technique described by Diwan et al. in "Compiler Support for Garbage Collections in a Statically Typed Language", Proceedings of the SIGPLAN '92 Conference on Programming Language Design and Implementation, pages 273-282. San Francisco, Calif., June 1992, SIGPLAN, ACM Press. Furthermore, the generating operations 500 and 502 may be performed concurrently using known techniques. In the table pair, each entry in the second call site table corresponds to an entry in the initial descriptor table.

A sorting operation 504 sorts the table pair using the descriptors in the initial descriptor table as the sorting key. As such, all identical descriptors are grouped together in the table pair as a result of the sorting operation 504. Likewise, the call site identifiers in the second call site table are also re-ordered to correspond with their sorted descriptor counterparts in the initial descriptor table. A generating operation 506 generates a descriptor reference table associated with the first call site table, such that each descriptor reference entry in the descriptor reference table corresponds to a call site identifier. At this point in the processing, the descriptor reference table may be empty. An initiation operation 508 initiates a counted to 0 and goes to the first descriptor in the initial descriptor table (i.e., at this point, the first descriptor is considered the current descriptor).

A storing operation 510 stores the current descriptor in a compact descriptor table. In an embodiment of the present invention, the compact descriptor table is described as "compact" because it will not contain duplicate descriptors, in contrast to the initial descriptor table, which does contain duplicate descriptors. A storing operation 512 determines the call site identifier that corresponds with the current descriptor in the table pair and finds the same call site identifier in the first call site table (e.g., using a binary search through the first call site table). The storing operation 512 then stores the current counter value into the descriptor reference table entry, so that the current counter is associated with the same call site identifier in the first call site table. The current counter value operates as an ordinal identifier of the unique descriptors in the initial descriptor table, and, hence, in the compact descriptor table. In this manner, the call site identifier is mapped to a descriptor reference that represents an ordinal identifier (e.g. an index) into the compact descriptor table.

A conditional operation 514 determines whether any more descriptors exist in the initial descriptor table. If not, the table pair is destroyed and the processing terminates at END operation 516. If more descriptors exist, traversing operation 518 proceeds to the next descriptor in the initial descriptor table.

A conditional operation 520 determines whether the next descriptor (i.e., the new descriptor) is identical to the previous descriptor (i.e., the old descriptor). If not, counting operation 522 increments a counter and processing proceeds to the storing operation 510. Otherwise, a duplicate descriptor has been encountered. Therefore, the counter is not incremented, and operation 512 determines the new call site identifier that corresponds with the current descriptor in the table pair. The storing operation 512 then stores the counter value in the descriptor reference table entry that corresponds with the same call site identifier in the first call site table. Processing proceeds until all descriptors have been evaluated and the compact descriptor table has been generated for all call site identifiers in the first call site table without descriptor duplication.

In an alternative embodiment, an improvement that avoids the need to search during the storing operation 512 is to form a table pair where the second call site table is replaced by a table of indexes from 1 to N, where N is the number of call sites in the original call site table. The sorting operation 504 then sorts the table pair as before using the descriptors in the initial descriptor table as the sorting key. All the indexes of call site identifiers in the table of indexes are reordered to correspond with their sorted descriptor counterparts in the initial descriptor table. The store operation 512 then determines the index that corresponds to the current descriptor in the table pair and stores the current counter value into the descriptor reference table entry at that index.

Figure 6:
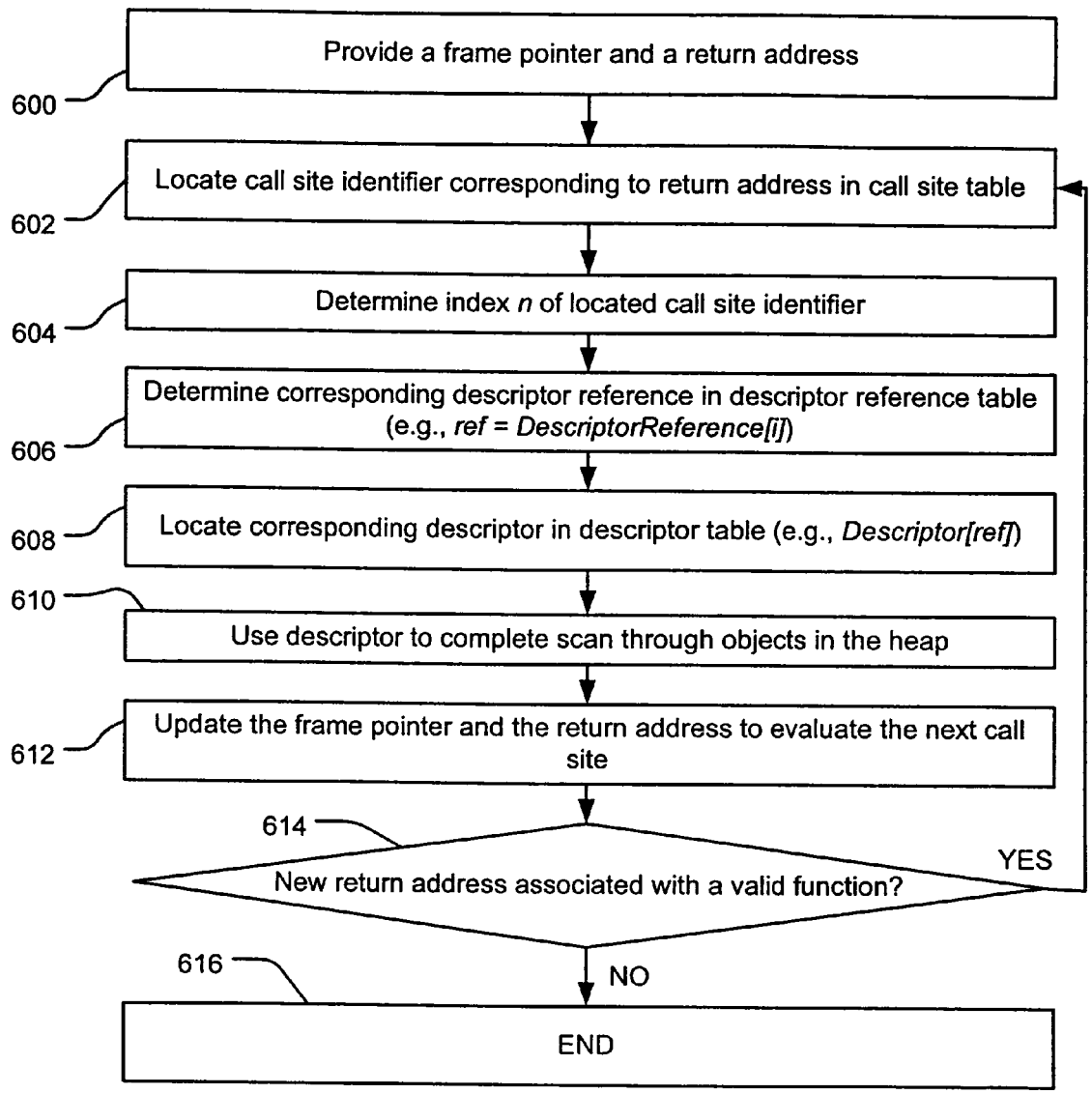
FIG. 6 depicts operations for traversing through a call stack using compact garbage collection tables in an embodiment of the present invention.

FIG. 6 depicts operations for traversing through a call stack using compact garbage collection tables in an embodiment of the present invention. During runtime, a garbage collector traverses through the compact garbage collection tables to identify root set elements from which to begin scans of the heap. In the exemplary process illustrated FIG. 6, an initial operation 600 provides a frame pointer and a return address. For example, the initial operation 600 may be embodied by a call to a garbage collection function that walks the call stack and recursively scans the heap objects referenced by stack frame pointers and registers. In the exemplary embodiment, the call includes a frame pointer parameter and a return address parameter as arguments. The frame pointer references a current stack frame, and a return address references an address in the procedure associated with the stack frame at which execution will resume after a call is completed.

A locating operation 602 searches the call site table and locates the call site identifier corresponding to the return address provided in initial operation 600 (or an updating operation 612). In one embodiment, the locating operation 602 may employ a binary search to locate the desired call site identifier in the call site table, although any type of search may be employed within the scope of the present invention. By locating the desired call site identifier, the determining operation 604 can determine the call site number n (e.g., index) of the located call site identifier in the call site table. Using the call site number n, a determining operation 606 accesses the descriptor reference table and determines the descriptor reference ref of the located call site identifier. In one embodiment, the correspondence between the call site table and the descriptor reference table is based on the index of each entry (e.g., ref=DescriptorReference[n], where DescriptorReference[n] provides a descriptor reference at index n in the descriptor reference table). That is, both tables are the same length, and there is a one-to-one sequential correspondence between the two tables (see FIG. 7). Therefore, the call site number n may be embodied by an index into both the call site table and the descriptor reference table. It should be understood, however, that correspondence between call site identifiers and descriptor references may be accomplished by other means, including a hash table, pointer, or other mapping reference.

A locating operation 608 uses the descriptor reference to locate the appropriate descriptor in the descriptor table. In an exemplary embodiment of the present invention, a descriptor reference is embodied by an index into the descriptor table, and the desired descriptor is located using a construct such as Descriptor[ref], where Descriptor[ref] provides a descriptor at index ref in the descriptor table. However, in an alternative embodiment, the descriptor reference may be a pointer, a segmented pointer, a hash key, or another reference into the descriptor table.

A scanning operation 610 uses the located descriptor to determine pointers in the present stack frame. The scanning operation 610 follows the pointers into the heap to scan heap objects for additional live pointers during the garbage collection process. Thereafter, an updating operation 612 updates the frame pointer and the return address to evaluate the next call site. In an embodiment of the present invention, the contents of the current frame pointer indicate the next frame pointer (e.g., newfp=*fp)), and the contents of the address immediately above the frame pointer contains the next return address in the call stack (e.g., newReturnAddress=*(fp+4)). See FIG. 6 to consider the exemplary updating instructions with regard to the exemplary stack frame.

A conditional operation 614 determines whether the new return address is associated with a valid function. If not, the stack walk terminates at END operation 616. Otherwise, processing proceeds to locating operation 602 to locate the next call site identifier in the call site table, as indicated by the updated return address.

Figure 7:
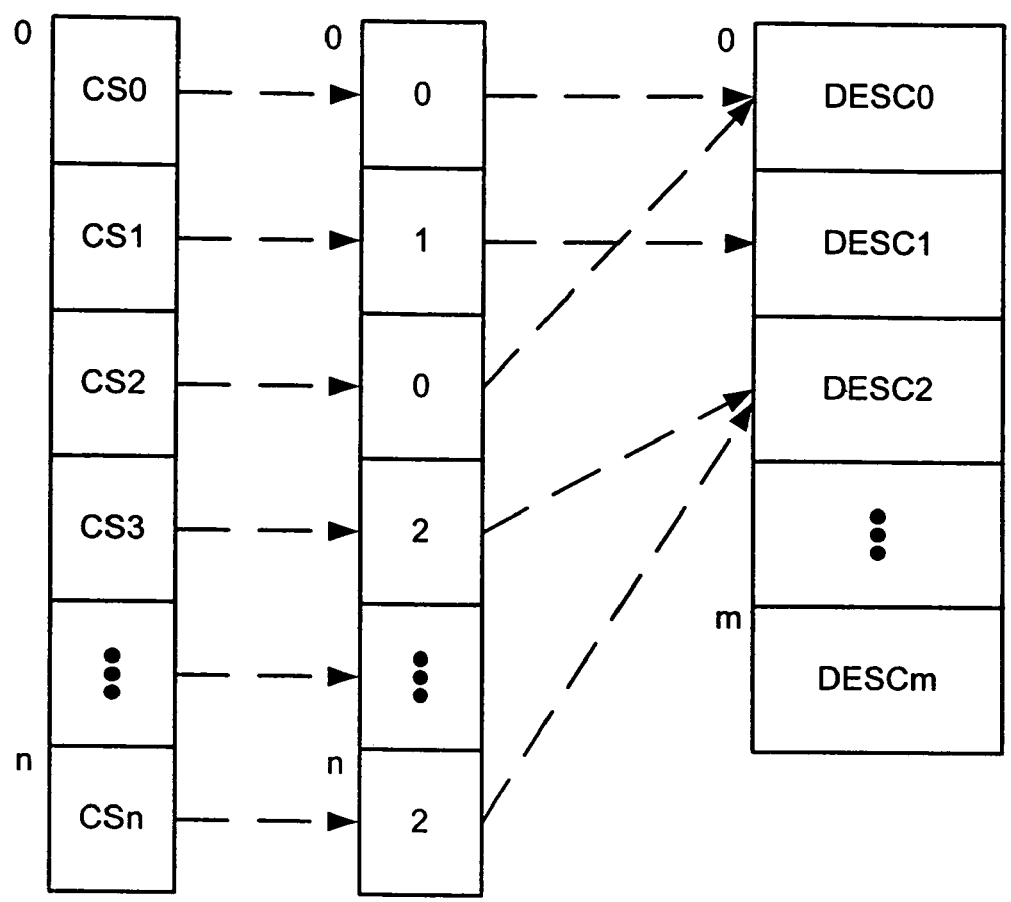
FIG. 7 depicts exemplary compact garbage collection tables in an embodiment of the present invention.

FIG. 7 depicts exemplary compact garbage collection tables in an embodiment of the present invention. The compact garbage collection tables 700 include a call site table 702, a descriptor reference table 704 and a descriptor table 706. The call site table 702 includes n call site identifiers CS0-CSn, such as return addresses. The descriptor reference table 704 includes n descriptor references. The descriptor reference table 704 is illustrated in FIG. 7 as being populated by exemplary indices into the descriptor table 706. It should be understood, however, that other references into the descriptor table 706 may be employed within the scope of the present invention, such as hash keys and pointers.

As illustrated, each descriptor reference corresponds with a call site identifier in the call site table (as shown by dashed-line arrows 708). The index of the call site identifier is also the index of the corresponding descriptor reference. As discussed previously, non-index call site numbers may be employed within the scope of the present invention. In addition, each descriptor reference corresponds to a descriptor in the descriptor table 706 (as shown by dashed-line arrows 710). The descriptor table 706 includes unique descriptors DESC0-DESCm.

As described, the descriptor reference table 704 provides an indirect mapping between the call site identifiers and a corresponding descriptor. As such, duplicate descriptors may be combined into a single descriptor that is referenced by multiple descriptor references and hence, multiple call site identifiers, even if the call site identifiers are not adjacent in the call site table.

Figure 8:
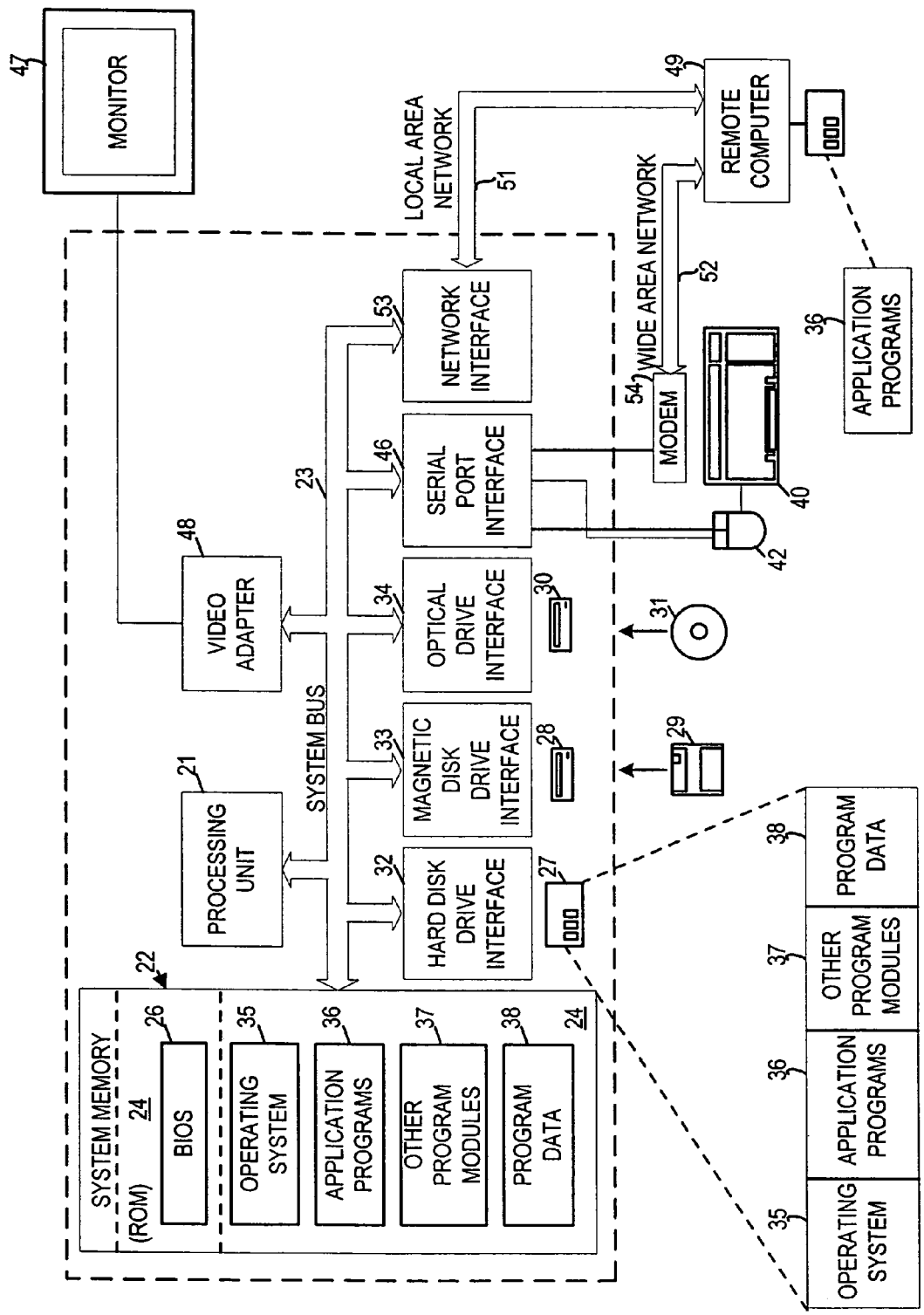
FIG. 8 illustrates an exemplary system useful for implementing an embodiment of the present invention.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a compiler that generates compact garbage collection tables and/or a runtime system that garbage collects using such tables may be incorporated as part of the operating system 35, application programs 36, or other program modules 37. The compact garbage collection tables and any intermediate tables used to generate the compact garbage collection tables may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer-readable medium encoding a computer program for executing on a computer system a computer process for identifying a set of pointers to a heap, the pointers in a call stack, the computer process comprising:
    generating a first call site table storing call site identifiers, each call site identifier identifying the location of a different call site;
    generating a final descriptor table storing a set of unique descriptors to be associated with one or more stack frames, each unique descriptor describing a set of registers containing pointers to the heap and a set of offsets relative to a location within each of the one or more stack frames containing pointers to the heap;
    traversing the call stack and associating a first stack frame in the call stack with a first call site identifier using the first call site table;
    associating the first call site identifier with a first unique descriptor in the final descriptor table; and
    using the first unique descriptor to identify the set of registers containing pointers to the heap associated with the first stack frame and the locations of pointers within the first stack frame containing pointers to the heap.

2. The computer-readable medium of claim 1 wherein at least two call site identifiers are mapped to the same unique descriptor in the final descriptor table.

3. The computer-readable medium of claim 1 wherein the operation of generating a first call site table comprises:
    storing return addresses for one or more call sites into the call site table.

4. The computer-readable medium of claim 1 wherein the operation of generating a final descriptor table comprises:
    generating an initial descriptor table including at least two identical descriptors, each descriptor in the initial descriptor table corresponding with a call site identifier in the call site table;
    copying each descriptor from the initial descriptor table to the final descriptor table, if the descriptor is not identical to another descriptor already copied to the final descriptor table.

5. The computer-readable medium of claim 1 wherein associating the first call site identifier with a first unique descriptor in the final descriptor table comprises:
    generating a descriptor reference table associated with the first call site table, each entry in the descriptor reference table mapping a call site identifier in the first call site table to one of the unique descriptors in the final descriptor table; and
    associating the first call site identifier with a first unique descriptor in the final descriptor table using the descriptor reference table.

6. The computer-readable medium of claim 5 wherein the operation of generating a descriptor reference table comprises:

generating a table pair including a second call site table and an initial descriptor table, the initial descriptor table storing descriptors that include at least two identical descriptors;

sorting the table pair based on the descriptors in the initial descriptor table to provide a sorted table pair;

traversing sequentially through the descriptors in the sorted table pair to associate a reference to each call site in the second call site table, the reference being modified when a unique descriptor is encountered in the initial descriptor table;

identifying each call site identifier in the second call site table to which each reference is associated; and storing each reference into the descriptor reference table in association with the call site identifier identified in the identifying operation.

7. The computer-readable medium of claim 5 wherein the reference is an ordinal identifier of unique descriptors being processed during the traversing operation.

8. The computer-readable medium of claim 5 wherein the traversing operation comprises:

incrementing the ordinal identifier when a unique descriptor is encountered in the initial descriptor table.

9. The computer-readable medium of claim 5 wherein the reference includes a pointer to one of the unique descriptors stored in the final descriptor table.

10. The computer-readable medium of claim 9 wherein the traversing operation comprises:

designating as the reference a new pointer to one of the unique descriptors in the final descriptor table when a unique descriptor is encountered in the initial descriptor table.

11. The computer-readable medium of claim 1 wherein associating the first call site identifier with a first unique descriptor in the final descriptor table comprises:

generating an initial descriptor table, the initial descriptor table storing descriptors that include at least two identical descriptors;

sorting the initial descriptor table and the first call site table based on the descriptors in the initial descriptor table to provide a sorted table pair;

traversing sequentially through the descriptors in the sorted table pair to associate a reference to each call site in the first call site table, the reference being modified when a unique descriptor is encountered in the initial descriptor table; and storing each reference into the first call site table.

* * * * *

UNITED STATES PATENT AND TRADEMARK OFFICE
CERTIFICATE OF CORRECTION

PATENT NO. : 7,509,338 B1
APPLICATION NO. : 11/215896
DATED : March 24, 2009
INVENTOR(S) : David R. Tarditi Page 1 of 1

It is certified that error appears in the above-identified patent and that said Letters Patent is hereby corrected as shown below:

On Face page, in field (63), under "Related U. S. Application Data" column 1, line 2, delete "Jul. 30, 2005" and insert -- Jul. 30, 2001 --, therefor.

Signed and Sealed this
Third Day of May, 2011

David J. Kappos
*Director of the United States Patent and Trademark Office*